United States Patent [19]

Marcotte

[11] 4,154,685

[45] May 15, 1979

[54] GRAVITY FLOW SEPTIC TANK SYSTEM

[76] Inventor: Oliver Marcotte, 25000 W. Ten Mile Rd., Southfield, Mich. 48075

[21] Appl. No.: 891,551

[22] Filed: Mar. 30, 1978

Related U.S. Application Data

[63] Continuation-in-part of Ser. No. 793,628, May 4, 1977, abandoned.

[51] Int. Cl.² ........................ B01D 21/24; C02C 1/14
[52] U.S. Cl. .................................... 210/255; 210/262; 210/532 S
[58] Field of Search .................. 210/170, 195 S, 197, 210/218, 220, 221 R, 221 M, 221 P, 255, 262, 512 R, 513, 523, 525, 532 S, 537, 540

[56] References Cited

U.S. PATENT DOCUMENTS

| | | | |
|---|---|---|---|
| 1,188,159 | 6/1916 | Dittrick | 210/540 X |
| 1,407,389 | 2/1922 | Lhorbe | 210/532 S |
| 1,707,077 | 3/1929 | Comyn | 210/537 |
| 2,337,859 | 12/1943 | Stuller | 210/525 |
| 2,439,633 | 4/1948 | Reinhart | 210/525 |
| 2,707,560 | 5/1955 | McRae et al. | 210/523 |
| 2,717,873 | 9/1955 | Montgomery et al. | 210/512 R X |
| 2,792,125 | 5/1957 | Gallacher | 210/532 S X |
| 3,109,813 | 11/1963 | Bergsten et al. | 210/532 S |
| 3,433,258 | 3/1969 | Steele | 210/532 S X |
| 3,447,688 | 6/1969 | MacCabe | 210/540 X |

FOREIGN PATENT DOCUMENTS

| | | | |
|---|---|---|---|
| 1036771 | 8/1958 | Fed. Rep. of Germany | 210/532 S |
| 29668 | 11/1903 | Switzerland | 210/532 S |

*Primary Examiner*—Robert H. Spitzer
*Attorney, Agent, or Firm*—Wilson, Fraser & Clemens

[57] ABSTRACT

The invention provides a septic tank system of greatly improved effectiveness in maintaining optimum bacterial action for a maximum length of time by utilizing a plurality of series connected tanks with the water level in each successive tank being lower than that in the first tank so that gravity flow is established between the successive tanks. A unique transfer means is provided between each of the successive tanks comprising one or more horizontal pipes having their inlet ends closed, and each horizontal pipe having one or more horizontal slots formed in the wall thereof at a level above the bottom of the pipe bore to permit the removal of scum through said slots by entrainment and/or suction action of the fluid flowing through the transfer pipe, thereby permitting gases to freely escape through the scum from the effluent surface of each tank and preventing the deleterious effects of trapped gases upon the biodegradation action normally produced in each successive septic tank.

7 Claims, 4 Drawing Figures

GRAVITY FLOW SEPTIC TANK SYSTEM

RELATED APPLICATIONS

This application is a continuation-in-part of Ser. No. 793,628 filed May 4, 1977 in the name of Oliver Marcotte for "Gravity Flow Septic Tank System", now abandoned.

BACKGROUND OF THE INVENTION

Septic tanks have long been utilized as the primary means for residential sewage disposal in areas to which sewer lines have not been extended. A normal septic tank system employs only a single tank and the liquid effluent from such tank is drained through a leaching field. The primary function of the basic septic tank is to subject the solid materials in the sewage to biodegradation action of bacteria which normally develops in such tanks or which can be applied thereto. The bacterialogical action normally converts the great majority of solid materials into relatively harmless soluble materials, gases and insoluble material. The insolubles remaining after the completion of the bacterial action collect in the bottom of the tank as a sludge which must be periodically removed.

The effectiveness of most septic tanks, however, is not limited by the accumulation of sludge but rather by the accumulation upon the top of the effluent of a scum or skin which comprises oily or fatty liquids and particles of untreated or partially-treated solids surrounded by gases resulting in a flotation of such particles to the surface of the effluent. The existence of such scum or skin is highly deleterious to the effective action of the bacteriological degradation process in the septic tank because the bacteriological action is greatly diminished to the point of suffocation. The existence of a heavy scum or skin layer on the top of the effluent effectively prevents the generation of gases, which are primarily methane and carbon dioxide, by anaerobic bacteria mainly in the sludge. The generated gases cannot escape and the high gas concentration adversely effects the bacteriological action. The result is that the tank scoures, not because of the accumulation of sludge, but because of the concentration of scum or skin on the surface of the tank fluid, prevents effective bacteriological degradation. In severe situations, the discharge of the tank may have such a high concentration of untreated sewage as to cause spoilage of the leaching bed.

The adverse effects of scum on the surface of a sewage effluent has been well recognized in commercial and municipal sewage treatment systems to the extent that elaborate mechanical arrangements have been provided to move scrapers or buckets across the top of the effluent to remove the scum therefrom and discharge it exteriorly of the treatment tank or basin and separate from the normal effluent. Unfortunately, any type of mechanical system for removal of scum is far too expensive to be practical for typical home sewage systems; more importantly, the requirement for moving components necessarily means that constant maintenance would be required to keep the system in operable condition.

Typical mechanical systems of the type heretofor discussed may be found in U.S. Pat. No. 2,237,172 to Briggs, U.S. Pat. No. 2,337,859 to Stuller, U.S. Pat. No. 2,455,338 to Lind and U.S. Pat. No. 2,780,361 to Evans et al.

In Briggs U.S. Pat. No. 2,237,172, a sewage settling tank is provided with motor driven flights which skims scum from sewage to the entry to an ascending chute across which a second set of motor driven flights extend to lift the scum over the lip of an open trough above the liquid level within the tank. The liquid is withdrawn through an effluent port spaced laterally from the trough, and at a level below the trough.

Stuller U.S. Pat. No. 2,337,859 discloses a tank with flights extending through the liquid level surface defined by a weir in an outlet channel and motor driven toward an auxiliary scum remover pipe spaced from the outlet channel. The scum remover has elongate widemouthed apertures in the pipewall which extend longitudinally of the pipe above the liquid surface level in one condition and can be lowered to and below that surface by rotation of the pipe around its longitudinal axis.

Lind U.S. Pat. No. 2,455,338 is similar to Stuller in general arrangement but has a float actuated scum remover pipe for driving the pipe in rotation by means of a limit switch, electric motor and gearing rather than the manual rotating means of Stuller.

Evans et al. U.S. Pat. No. 2,780,361 has a scum remover separate from the outlet port for effluent from a waste liquid treatment tank. A motor driven skimmer board is arranged to rotate about the central axis of a circular tank to carry the scum on the liquid surface to a scum-receiving pipe having a ported area parallel to its longitudinal axis. The port may be in the form of a continuous wide mouthed slot and the pipe is arranged with adjusting means to raise or lower the port with respect to the liquid surface in the tank.

In addition to the elongate scum removers extending laterally over a substantial portion of treatment tanks, there have been removers of limited extent as shown in U.S. Pat. No. 1,188,159 to Dittrick, U.S. Pat. No. 2,439,633 to Reinhart, U.S. Pat. No. 2,717,873 to Montgomery et al., and U.S. Pat. No. 3,433,258 to Steel.

Dittrick U.S. Pat. No. 1,188,159 and Reinhart U.S. Pat. No. 2,717,873 each shows a self cleaning sanitary cistern including an exit at a lower portion and a funnel at the liquid surface to drain material from the upper surface as a skimmer. The funnel is of limited lateral extent and would not collect scum across a broad area of the liquid surface.

Montgomery et al. U.S. Pat. No. 2,717,873 discloses a clarifier and digester having an open ended, and longitudinally slotted, short pipe extending into a tank at a region remote from the primary exit of liquid.

Steele U.S. Pat. No. 3,433,258 discloses a tank which may be used as a septic tank and is provided with a stub pipe outlet having an array of circumferentially spaced longitudinal slots. The pipe has a closed end containing a central aperture and the slot array extends around the periphery to form an outlet strainer rather than a scum remover over a broad expanse of the liquid surface in the tank.

While multistage sewage treatment arrangements are known, particularly for community and industrial systems, these systems generally include mechanisms having the mechanical pumps, scrapers, and scum removal systems of the type discussed above. Domestic septic systems are known with multi compartmented septic tanks and even multi tanks connected in series. However, the inhibiting of anaerobic digestion by the development of scum which inhibits the escape of gas from the liquid has been found to progress in such serially related tanks such that each tank develops a scum at a progressively lower rate if direct flow from its preceding tank is permitted. Ultimately, the scum is passed to all tanks with the anerobic action deteriorating in the tank first to receive the waste fluids to a point that it becomes essentially a solids trap and the intended initial breakdown of the sewage is transferred to the next tank of the series. When permitted to continue, ultimately all tanks have their anaerobic activity blocked. German Pat. No. 1,036,771 of Aug. 14, 1958 shows a multicompartmented septic tank of this general construction wherein a thick layer of scum has developed on the surfaces of the first compartment and, although the sewage passing to the second compartment is drawn from the lower portion of the first compartment it too develops a scum layer. The German disclosure appears to contemplate a high density scum since it would appear that the gravity overflow exit to the following compartment of the series is located at the scum surface.

In accordance with the above, an object of this invention is to improve scum removal over the upper surface of the liquid in a septic tank system.

A second object of this invention is to minimize the development of scum in the initial compartment or tank of a septic system to maintain anerobic action in that tank by passing metered quantities of scum to a next compartment for breakdown. This removal of scum from the preceding section mitigates against the inhibiting buildup in the first section while maintaining levels in the succeeding section which can be broken down by anaerobic action.

Another object is to eliminate mechanical movement of the scum removal equipment and the attendant complexity and maintenance burdens of such equipment.

A further object is to enhance the anaerobic digestion of sewage by removal of scum and the avoidance of the buildup of suffocating scum layers in septic tanks.

FEATURES OF THE INVENTION

It is accordingly a feature of this invention to provide an improved sewage treatment system primarily for residential use, and employing only gravity flow of the effluent through the system.

A further feature of this invention is to provide a residential sewage system comprising a plurality of series connected septic tanks, with each successive tank having its outlet disposed at a slightly lower level than the preceding tank so that transfer of effluent through the tanks occurs by gravitational action, and to provide novel transfer means between each of the successive tanks which concurrently effect the removal of substantially all of the scum or skin collecting on the surface of the respective tanks solely through the suction and/or entraining action of the effluent passing through the transfer means.

Another feature of this invention is to provide an improved scum removing transfer system for effecting the transfer of effluent from one series connected tank to the next, characterized by the utilization of horizontal pipes as the primary transfer conduit disposed at the desired fluid level in the respective tank and provided with a closed end to avoid alternative liquid flow paths to the exit and one or more longitudinally extending slots located slightly above the bottom of the bore of the pipe to function as a scum removing mechanism operably solely by the suction and/or entrainment action of the effluent passing through the transfer pipe. Advantageously, the scum removing pipes extend over a broad lateral extent of the tanks with the scum collection area more extensive in the tanks earlier in the treatment sequence to overcome the greater tendency to develop scum in the initial treatment tanks. Enhanced flow of scum is achieved by withdrawing the liquid effluent through the scum removing slots.

A particular feature of this invention is a domestic septic system which includes a series of four sections each with the closed end and slotted pipe effluent and scum removal means such that scum buildup is held in the range in each so that anaerobic activity is maintained in each. It has been found that for normal home installations, four sections of a thousand gallon capacity each when interconnected by the scum removing pipes reduce the material exiting the fourth section to an essentially clear liquid which can safely be issued to a leach bed. Organic material from disposals and lavatory and toilet waste can be disposed of in this system with no need for periodic cleaning of the tanks.

Further objects and features of this invention will become apparent from the following detailed description, taken in conjunction with the annexed sheets of drawings.

DETAILED DESCRIPTION OF A PREFERRED EMBODIMENT

Figure 1:
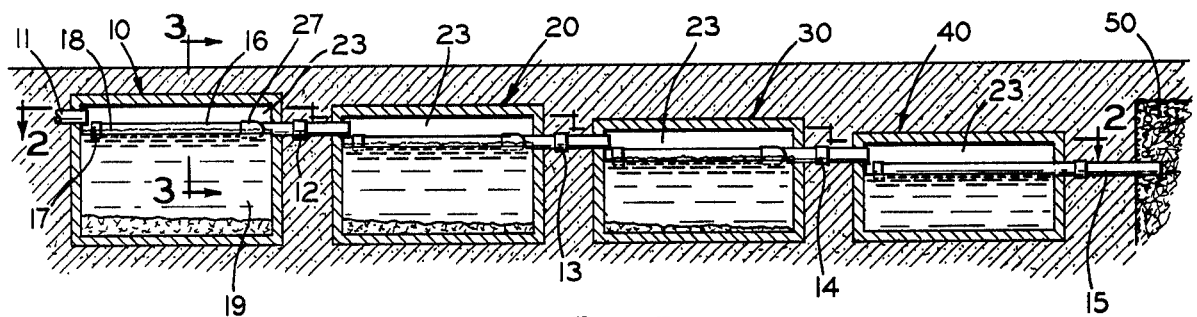
FIG. 1 is a schematic vertical sectional view of a septic tank system embodying this invention.
Figure 2:
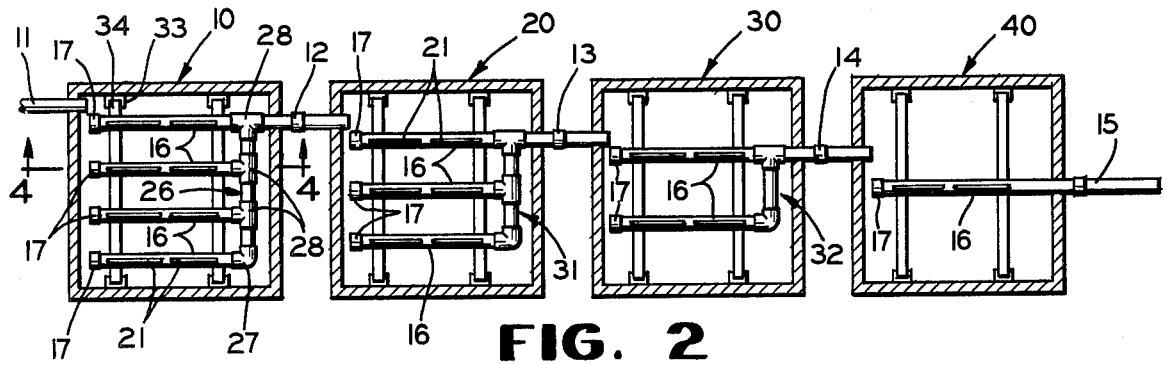
FIG. 2 is a plan view of the system of FIG. 1 taken at section line 2—2 showing the arrangement of tanks and effluent-scum collecting pipes utilized in the septic tank system.

Referring now particularly to FIGS. 1 and 2, an inlet pipe 11 carrying raw sewage connects with the top of the interior of the first of the plurality of series connected septic tanks 10, 20, 30 and 40. Transfer connections 12, 13, 14 and 15 are respectively provided between tanks 10 and 20, 20 and 30, 30 and 40, and between tank 40 and the inlet end of the leaching bed 50.

The consecutive tanks can all be disposed in the soil at the same vertical level and, since the effluent flows through the septic tank system solely by gravity, it is necessary that the transfer connections 12, 13, 14 and 15 be at successively lower levels than the inlet pipe 11. Accordingly, the effective fluid holding capacity of each successive tank is reduced if each tank has the same lateral extent as shown in the arrangement of FIG. 2 and successively smaller tanks are utilized. In contrast, where the successive tanks are respectively disposed at lower levels than the preceding tanks, gravity flow of the effluent may be achieved without reducing the effective fluid holding capacity of each of the successive tanks by setting tanks of the same size at successively lower levels.

Figure 3:
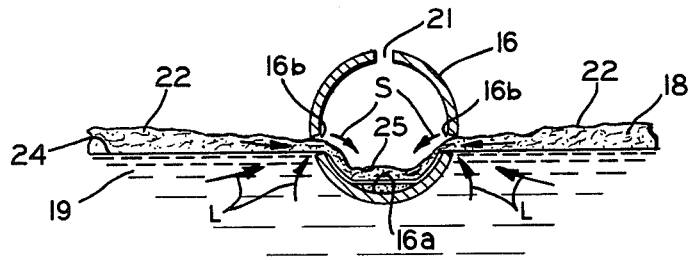
FIG. 3 is a large scale cross-sectional view of one of the transfer pipes as at 3—3 of FIG. 1 employed in the septic tank system of FIGS. 1 and 2.
Figure 4:
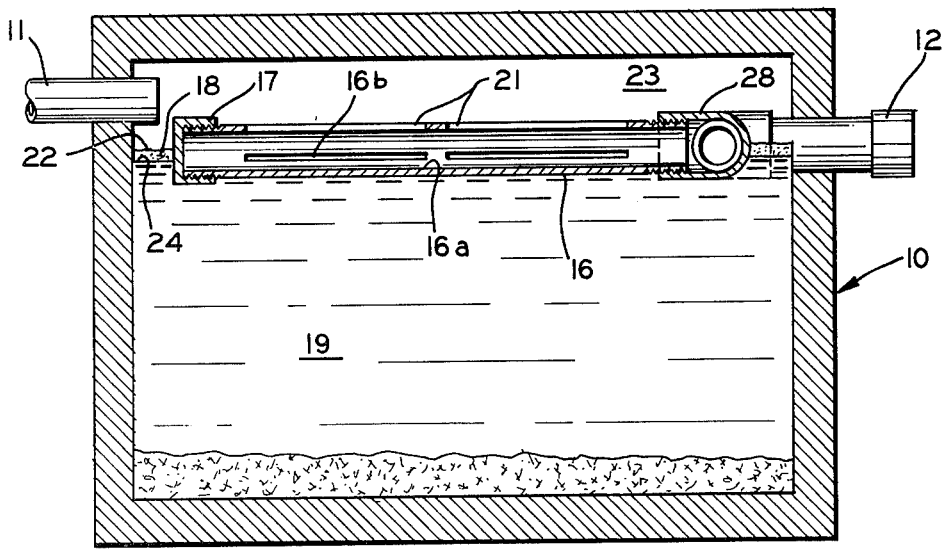
FIG. 4 is a large scale fragmentary longitudinal sectional view of one of the transfer pipes of FIGS. 1 and 2 taken at 4—4 of FIG. 2.

Referring now particularly to FIGS. 3 and 4, each successive transfer connection 12, 13, 14 and 15 incorporates at least one horizontal transfer pipe section 16, formed from plastic or other corrosion resistant material, having one end closed by a cap 17. The construction and positioning of each horizontal transfer pipe 16 forms an important element of this invention. The pipe or pipes 16 are arrayed horizontally in each tank. Inherently, the level of the bottom of the bore 16a of pipe 16 determines the effluent level in each successive tank. In accordance with this invention, one or more narrow axially extending slits 16b are provided in each transfer pipe 16 at an elevation above the bottom of the bore of such pipe and below the horizontal plane through the center of each pipe. The slits may comprise a pair of relatively long slits 16b on opposite sides of the pipe at the same horizontal plane level.

The slit or slits 16b function to effectively remove scum 18 accumulating on the top of the liquid 19 in the particular tank. Such scum 18 is primarily composed of untreated or partially treated particles of solid sewage to which are adhered sufficient bubbles of carbon dioxide or methane gas to effectively float such particles to the top of the liquid 19. Such particles are drawn into the interior of the transfer pipe 16 through the suction action of the liquid passing through the slits to the next tank and, in the course of such transfer, much of the gases are dislodged from the particles so when the particles enter the next successive tank they tend to settle in the bottom of the tank and are subjected to the full bacterial action of the next tank.

Each pipe 16 is provided with a gas vent 21 which may be in the form of an elongate slit extending longitudinally of the pipe along its uppermost surface, preferably above but at least near the upper surface 22 of the scum 18 for release of the gas to the air space 23 above the sum. This gas can then flow back through the inlet (14, 13, 12 or 11) and ultimately to the sewage stack vent (not shown).

As seen in FIGS. 3 and 4, the addition of influent from inlet 11, 12 or 13 to the tank tends to raise the liquid surface level 24. Solids of a size exceeding that passable by the slits 16b are retained in the first tank 10 and either settle to the bottom or float in or below the scum-liquid interface 24. Liquid flows into the slits 16b as added influent tends to raise the level 24 and entrains particles of scum which can be accommodated to pass slits 16b. It has been found advantageous to provide slits 16b which are horizontal and, thus, draw liquid and scum into the pipe 16 over their entire length. Further buildup of scum over a broad area is avoided by extending the slits over the surface of the scum-liquid interface 24. Typically, each sixty inch length of four inch P.V.C. pipe has been provided with fifty inches of slit 16b along its length with the slit formed three-eights of an inch wide so that the two opposed slits 16b, one hundred inches of effective scum removal length are presented at the interface 24.

In FIG. 3, the flow of liquid and scum into slits 16b and pipe 16, is illustrated whereby the scum thickness is diminished in the vicinity of the transfer pipe 16 by withdrawal of that material, particularly in the interface region. Arrows S represents this withdrawal along with the liquid flow of arrows L in that region. The relatively limited depth of scum and liquid 25 at the bottom side in transfer pipe 16 are in a state to evolve gas which is easily passed through the thin scum layer as it is broken down. That gas generated by action in the pipe along with the gas from succeeding stages of the system escapes to the air space 23 through vent 21. Vent 21 may also be a slit of about three-eights inch width and a comparable length to slit 16b.

The introduction of scum inducing influent is greatest in the first section of the system, tank 10. Hence it is desirable to provide a scum removal capacity over a broad area of the interface 24. This is accomplished by employing an array of spaced transfer pipes 16 which extend across a major portion of the breadth and width of the interface 24. Subsequent sections of the system can be similarly equipped. However, economic considerations dictate a reduction in the scum removal area as the tendency to generate scum is reduced in the succeeding sections. One contemplated arrangement employs four lengths of transfer pipe 6 in the first tank 10 and a reduction of one in each succeeding section to three pipes in tank 20, two pipes in tank 30 and one pipe in tank 40. Effectively, about one hundred square inches of scum collection slit area for slits 16b is provided in tank 10, seventy five square inches in tank 20, fifty square inches in tank 30, and twenty five square inches in tank 40.

With the exemplary arrangement, the biological oxygen demand (B.O.D.) in the several sections is greatly reduced from that of prior single tank domestic septic systems. It has been reported that the conventional prior systems have a B.O.D. of several thousand whereas the system disclosed has a B.O.D. of several hundred in tank 10, an approximate fifty percent reduction in tank 20, a further reduction of the influent from tank 20 of thirty percent in tank 30, and a still further reduction of influent from tank 30 of fifteen percent in tank 40. This indicates the toxic gases formed are exiting through the layer of scum and are not tending to suffocate the action in the tanks or leach bed.

Another set of criteria of success of the exemplary system is that of scum thickness. A thickness of only about one half inch develops in tank 10 while it is reduced to about one eighth inch in tank 20 and is almost totally eliminated in tanks 30 and 40.

It is theorized that the distributed removal of scum not only maintains the scum layer thin over a major portion of the liquid surface 24 but also unbalances the scum molecular surface tension, particularly in the transfer pipes to enhance the release of the toxic gases generated. The scum in the transfer pipes and succeeding sections releases its supporting gas and falls to the bottom as sludge where the anaerobic bacteria and natural process of breakdown continues, perhaps with the regeneration of scum which surfaces but is accomodated without detriment to the system by the repetition of the scum removal process, although to a lesser degree in each succeeding section.

The above described system is so effective in reducing the amount of scum in each of the successive tanks that the number of horizontal transfer pipes 16 incorporated in each of the successive transfer connections may be reduced in the manner illustrated in FIG. 2. Thus, the first tank 10 may have four horizontal transfer pipes 16, all connecting to a common header 26 by ells and ties 27 and 28 which in turn connect to the transfer connection 12 leading to the next tank. In the second tank 20, only three of the horizontal transfer pipes 16 may be employed similarly connected by a common header 31 to the transfer connection 3. The third tank has two transfer pipes 16 to header 32 and connection pipe 14 and the fourth tank employed may incorporate only a single transfer pipe 16 which connects directly to the transfer connection 15 and the leach bed 50.

In each case, the horizontal transfer pipes 16 may be supported within the respective tank in any suitable fashion, such for example in tank 10 by pairs of plastic brackets 33 bolted to opposite sides of the interior walls of the tank 10 and supporting plastic or other corrosion-resistant material support bars 34 on which the four horizontal transfer pipes 16 respectively rest. Alternatively, particularly as the number of transfer pipes 16 is reduced, cantilever brackets (not shown) are respectively provided to support the horizontal pipes 16.

Septic tank systems incorporating this invention are not necessarily limited to four tanks but should embody at least four successive tanks. The important aspect of this invention is the provision for the automatic removal of scum accumulating in the tanks in the system, solely by the gravity flow of effluent through the system.

With septic tank systems embodying this invention, the effective working life of the system is now limited only by the accumulation of sludge in the bottom of the tanks and, of course, more sludge generally accumulates in the bottom of the first tank than in any of the subsequent tanks. However, with the maintenance of a high level of anaerobic activity, sludge is reduced beyond that previously achieved in systems having no mechanical sludge removal equipment. In each installation made embodying this invention, there has been no problem of scouring of the tank due to the excessive accumulation of scum on the top of the effluent in any particular tank to effectively diminish or eliminate the normal bacterial action that should occur in a particular tank. As a result, the fluid discharged from the septic tank system embodying this invention may, by a passge through a conventional leaching field, be converted into potable water, hence, eliminating any danger of contamination of nearby wells or streams.

In summary, the present invention involves a four tank or chamber septic system operating without moveable parts which has enhanced self cleaning capabilities and enhanced effluent purification. The system utilizes gravity flow in a serial connection of elements including the four tanks so that the flow from each preceding tank to each succeeding effluent receiver, whether it be a succeeding tank or another receiver such as a leaching bed, is accomplished without mechanical drive means. Improved operations attributed to improve scum removal at the scum-liquid interface region to prevent the build up of a barrier of scum which would prevent gas release from the contents of the tank. Horizontal transfer pipes, extending essentially across a dimension of the liquid surface at the surface level, and provided with one or more narrow horizontal slots, draw down the scum and inhibit the carryover of larger particles of debris to the succeeding effluent receiver. While transfer pipes are shown with one end in fluid flow communication with a transfer connection, and the other end closed as by a cap, it is to be appreciated that the transfer pipes could be arranged to be free of apertures of greater width than the width of the horizontal scum receiving slots in order to inhibit debris carryover by other means and, therefore, the transfer pipes might be arranged in closed loop arrays where a header is coupled between the lengths of transfer pipe across the ends shown capped in the drawings.

Modifications of this invention will be readily apparent to those skilled in the art. Accordingly, it is intended that this disclosure be read as illustrative of the invention and not in a limiting sense.

I claim:

1. A septic tank system operable solely by gravity flow comprising, in combination:

at least four serially connected septic tank structures, each defining an enclosed chamber;

an inlet pipe communicating with the top portions of the first tank to transmit raw sewage thereto and an outlet pipe in the last tank located at a significantly lower level than said inlet pipe to discharge treated effluent to an effluent receiver;

a plurality of transfer connections respectively connecting each preceding tank to its next succeeding tank, and the fourth tank to the effluent receiver;

each of said transfer connections comprising at least one horizontal transfer pipe disposed at the upper level of the respective tank but slightly below the normal liquid level of the preceding tank, the outlet end of each transfer connection extending through the chamber wall and into the next succeeding effluent receiver;

each said horizontal transfer pipe having at least one horizontally extending narrow slot in the wall thereof at an elevation above the bottom of the pipe bore and below a horizontal plane passing through the centerline of the pipe, whereby accumulated scum on the liquid surface may be drawn through said slot and discharged into the next tank through the action of the liquid passing through each said horizontal pipe portion of said connections; and said transfer pipes being free of apertures of greater width than said narrow slot other than at the effluent communication path to the next succeeding effluent receiver whereby the carryover of particulate material is inhibited;

whereby the horizontally extending narrow slot removes scum and liquid at the scum-liquid interface over an interface surface region adjacent said slot to mitigate against the buildup of a barrier of scum preventing gas release from the contents of said tank.

2. The combination defined in claim 1 wherein said horizontal transfer pipe extends substantially across a dimension of the tank structure in which it is mounted and said horizontally extending slot extends along a major portion of the length of said pipe.

3. The combination according to claim 2 wherein said transfer pipe has a second horizontally extending narrow slot in horizontal alignment with said one slot and spaced tranversely of said pipe from said one slot.

4. The combination according to claim 2 wherein said transfer pipe has a vent in the upper wall portion and in gas flow communication with said pipe interior.

5. The combination defined in claim 1, wherein the connection between the first said tank chamber and the second comprises a plurality of said horizontal transfer pipes horizontally spaced across the said first chamber, having separate inlet portions and connecting to a common horizontal outlet pipe extending through the wall of said first chamber and into the next tank, and each subsequent one of said connections including a less number horizontal transfer pipes than said first connection.

6. The combination defined in claim 1 wherein said horizontal transfer pipe has an end remote from said transfer connection; and a closed cap on said remote end of said horizontal transfer pipe.

7. The combination defined in claim 1 wherein said slot areas in said succeeding transfer connections for succeeding tank chambers of said serial connected structures diminish.

* * * * *